(12) United States Patent
Chu

(10) Patent No.: US 12,100,024 B2
(45) Date of Patent: Sep. 24, 2024

(54) IDENTIFICATION SYSTEM FOR PETS AND METHOD/APPARATUS OF IDENTIFYING PETS USING IMAGE ANALYSIS

(71) Applicant: Viva Chu, Old Greenwich, CT (US)

(72) Inventor: Viva Chu, Old Greenwich, CT (US)

( * ) Notice: Subject to any disclaimer, the term of this patent is extended or adjusted under 35 U.S.C. 154(b) by 507 days.

(21) Appl. No.: 17/331,498

(22) Filed: May 26, 2021

(65) Prior Publication Data

US 2021/0326932 A1 Oct. 21, 2021

Related U.S. Application Data

(63) Continuation of application No. 16/159,534, filed on Oct. 12, 2018, now abandoned.

(51) Int. Cl.
| | |
|---|---|
| *G06T 7/73* | (2017.01) |
| *G06F 9/54* | (2006.01) |
| *G06F 16/27* | (2019.01) |
| *G06N 20/00* | (2019.01) |
| *G06Q 30/0251* | (2023.01) |
| *G06Q 40/08* | (2012.01) |
| *G06V 40/20* | (2022.01) |

(52) U.S. Cl.
CPC ......... *G06Q 30/0269* (2013.01); *G06F 9/547* (2013.01); *G06F 16/27* (2019.01); *G06N 20/00* (2019.01); *G06Q 40/08* (2013.01); *G06T 7/74* (2017.01); *G06V 40/20* (2022.01)

(58) Field of Classification Search
CPC ...... G06Q 30/0269; G06Q 40/08; G06T 7/74; G06F 16/27; G06F 9/547; G06N 20/00; G06V 40/20
See application file for complete search history.

(56) References Cited

U.S. PATENT DOCUMENTS

| | | | |
|---|---|---|---|
| 10,796,141 B1 * | 10/2020 | Shepherd, Jr. ....... | G06V 10/751 |
| 2015/0334994 A1 * | 11/2015 | Prasad ................. | A01K 11/008 |
| | | | 340/539.32 |
| 2016/0063188 A1 * | 3/2016 | Thornberry ............ | H04L 63/08 |
| | | | 705/3 |
| 2018/0060699 A1 * | 3/2018 | Ghazali ............... | G06F 18/2413 |

* cited by examiner

*Primary Examiner* — Edward Park
(74) *Attorney, Agent, or Firm* — John W. Carpenter

(57) ABSTRACT

A pet is identified by capturing or receiving an image containing the pet, isolating the pet in the image, and identifying the pet. Isolating the pet may include image enhancement, such as outlining the pet (e.g., a fur outline) or removing a background of the image. The identification may include comparison of various pet characteristics to a database of characteristics associated with known pets. The characteristics may be type of animal characteristics, breed characteristics, and specific pet characteristics and/or the pet's name. Pets and their characteristics may be may be added to the database using similar criteria forming a profile for each pet that may be used for other purposes. More than one pet may be linked to an owner such as through a mobile device ID and more than one owner or individual may be linked to a pet.

20 Claims, 5 Drawing Sheets

IDENTIFICATION SYSTEM FOR PETS AND METHOD/APPARATUS OF IDENTIFYING PETS USING IMAGE ANALYSIS

CROSS REFERENCE TO RELATED APPLICATIONS

This application is a continuation of pending U.S. application Ser. No. 16/159,534, filed on Oct. 12, 2018.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of Invention

The present invention relates to marketing and assessments made based on information derived from on-line presence, viewing habits, and preferences—particularly in relation to pets, pet owners, the pet industry, and others that can benefit from better predictions or analysis using such assessments or information.

Discussion of Background

Internet browser, web sites, applications, and other forms of sharing, displaying, or transmitting information are typically designed as a platform for advertising which either heavily subsidizes or provides a sole source of revenue for operation of the site. app, etc. Various protocols and methods are utilized to provide ads, links, and/or information that are most relevant or most likely to produce a desired result (click-through, purchase, or simply reading information) to various users/consumers.

SUMMARY OF THE INVENTION

The present inventor has realized the need for a wide range of services including direct marketing, assessments, including risk assessment. The invention utilizes the collection and sharing of information. In one embodiment, the present invention provides a pet profile, a digital profile relating to a pet.

In one embodiment, the present invention provides system for collecting and sharing data that defines a pet's digital profile. The pet profile (pet's digital profile) may be linked to a user ID (e.g. phone ID), and the pet profile may be provided via an API that accepts ID from, for example, registered customers (e.g., web site owners that would like to provide relevant targeted marketing) and returns the pet profile. The profile may include, for example, any combination of one or more of breed, age, weight, photos, videos, food preference, toy preference, adoption date, adoption source, birthdate, and location (and/or any other quantifiable collectible data or associations). The information transfer via API or other mechanism may be done for any customer site such as web pages, applications, apps, software, programs, and other systems, etc.

Other embodiments of the invention include methods and devices for collection of data for the digital profile. Such embodiments include, for example, an image & video recognition system which detects the breed, age, fur, facial features, and exact identity of a pet. Such information is gathered using any one or more of heuristics, AI/machine learning, and/or deep learning, cross-checking multiple databases and other information sources, and then applied in other applications including any of (one or more of) algorithm-based decision making, heuristics, AI/machine learning, deep learning, and/or the like.

Other embodiments of the invention include a method of intelligently cropping out a background of an image or video in which a pet is featured. Such cropping is designed to increase the accuracy of pet or object recognition programs, apps, APIs, etc. Such cropping may, for example, be based on unique characteristics of the pet's fur. Such cropping may be performed using machine/deep learning. The machine/deep learning based crop may continually advance in accuracy and/or usefulness of the crop across multiple APIs that may be checked, cross-checked, and/or rechecked with each new image or video.

Yet other embodiments of the invention include an image & video recognition system which detects the breed, age, fur, facial features, and exact (or best reasonable prediction as to the) identity of a pet.

The invention may further provide an advertising system which targets ads based on a pet's digital profile.

The invention may further provide a system to predict any of a user's interests, buying behavior, credit score, and insurance risk profile based on a pet's type, age, size, fur type, breed, adoption date, adoption source, or other information derived from pet photos/videos, profiles, and other data.

Portions of the invention whether embodied in a device, method, or embodied as a means for performing any one or more function as described or elaborated or herein may be conveniently implemented in programming on a general purpose computer, or networked computers, and the results may be displayed on an output device connected to any of the general purpose, networked computers, or transmitted to a remote device which may include a web browser, connected computer, or mobile device for output or display (such as an ad selected for and targeted to a specific user based on any of the embodiments or functions described herein). In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention may be embodied, for example, in an application (app) installed on a mobile device, as a program installed on a PC, or as a web site. One of the important features, regardless of platform is the collection of all types of data about a pet and its relations including its owned. For example, data may be collected on physical characteristics, genetics, purchasing habits, propensities, likes/dislikes, other data and data types discussed elsewhere herein, and any other data that is available to be collected.

The collected data is stored and may be distributed based on demands from customers for advertising and other needs. The collected data may be analyzed and correlated with/to a wide variety of products. For example, the collected data may be analyzed and correlated to credit risk, insurance risk, insurance pricing, life expectancies, purchasing profiles, actuarial data, property rental history, etc. These products may be used to generate revenue either through direct sale, inclusion in other products or analysis, or utilized for other decisions, deep/machine learning paradigms, directing/guiding a user experience on an app, web page, or other venue, etc.

Figure 1:
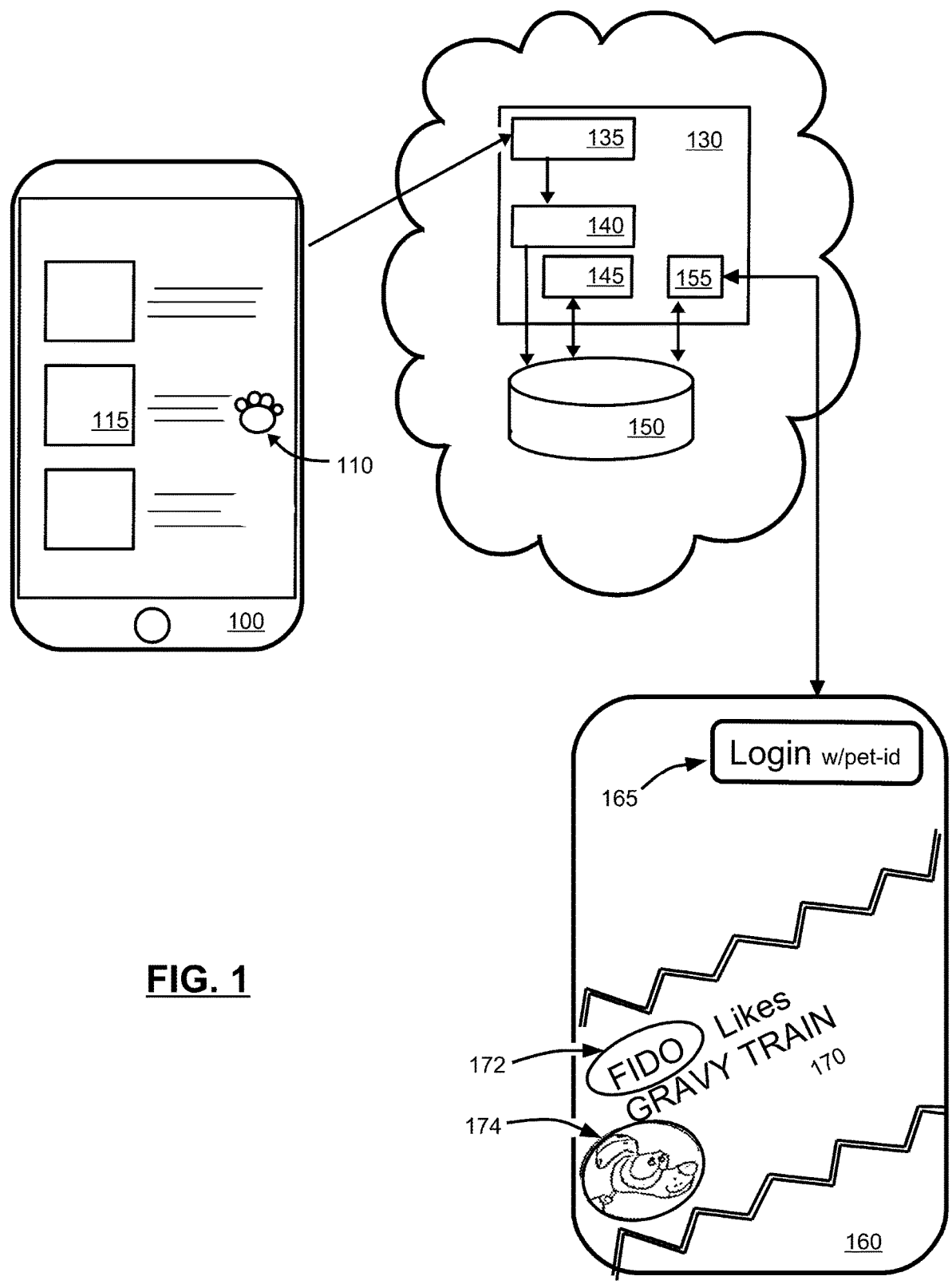
FIG. 1 illustrates an example screenshot and a system comprising various individually unique features of certain embodiments of the present invention including one-click registration, stated pet preferences (e.g., "paws-up"), and an API or other interface to share data with other applications when appropriate.

Referring now to the drawings, wherein like numerals designate identical or corresponding parts, and more particularly to FIG. 1 thereof, there is illustrated an example screenshot 100 of a system (or application/app) and comprising at least one individually unique feature of embodiments of the present invention. A paws-up button 110 is clicked or otherwise highlighted which provides at least one piece of data. The data is retrieved by process 135 of a server 130 (e.g., remote server in cloud). The retrieved data is organized by process 140 (encoding the data for efficiency, packing into data structures, etc.) and saved (or saved directly) in database 150 (also in cloud, for example).

An AI module 145 uses the saved data to run deep learning routines based on, for example, general rules or paradigms. The rules or paradigms may be changed over time or through many data passes until the results produce the best outcomes over the entire dataset (or a subset). Results of the rules applied to the data may also be saved in the database 150. Alternatively the refined rules are used by API 155 to send the most relevant data or results to third party apps.

For example, 3$^{rd}$ party app 160 includes a one-click registration system initiated by one-click on a logon/login (or registration) button 165 (which may be pre-populated with a nickname, pet name, or other name if known via cookies, persistent data, or other registration information available to the app). The logon button 165 initiates a request to API 155 that identifies a mobile user and retrieve's a pet profile representing the mobile user's pet's digital profile and preferences. The pet's digital profile may, for example, consist of name, login, weight, age, adoption date, adoption source, breed, pictures, videos, health records, etc. The information in the pet profile (e.g., the pet's digital profile) having been previously gathered from various unrelated sources such as pet e-commerce sites, rental application websites, credit card applications, veterinarian websites, pet related mobile apps, etc. The preferences were gathered, for example from likes (e.g., paws up 110 from a previous app), purchasing habits, videos watched, social media posts, etc., and refined by, for example, organization module 140 and/or AI module 145.

The pet profile may include embedded ads relevant to the pet or pet owner which may be utilized on app 160. The Ads may be a source of revenue for the maintainer of pet profile services (e.g., server 130 and database 150) and/or third party apps that subscribe to the pet profile services. Alternatively, the pet profile may be used by the third party app to determine what ads are to be placed (a separate AI or deep learning process hosted by developers of app 160, for example). Ultimately, the pet profile provides a basis to allow the app 160 to place a targeted ad most relevant to the pet.

In FIG. 1, app 160 displays (e.g., after logon and pet profile retrieval) targeted ad 170 ("FIDO likes GRAVY TRAIN"). The pet profile includes, for example, the pets name "FIDO" 172 and a picture or caricature 174 of FIDO, one, both, or none of which may be displayed depending on the preferences or, for example, the advertiser, the app, preferences in the pet profile, etc.

Shown and described is an embodiment having many possible variations of a basic system and process according to the present invention which includes stated pet preferences (e.g., "paws-up"), and an API or other interface to share data with other applications when appropriate. It is a unique system for collecting and sharing data that defines a pet's digital profile: name, login name, breed, age, weight, photos, videos, purchases, food preference, toy preference, adoption date, adoption source, birthdate, and location, etc.

Other features include a method of registering the unique device ID of a mobile electronics device or consumer electronic device with the digital identity of a pet. This enables a one-click registration and transfer of pet profile. Such a unique device ID may be hash coded to preserve anonymity and/or to secure identity control with the system operator.

The "one-click" signup button allows a pet owner, e.g., an individual or businesses, to easily register their pet's information with the system (e.g., app 160). Such information may also be provided by default, collected from questionnaire(s), retrieved from web sites or applications (e.g., app 100 collects information), retrieved from uploads including blog data, social media postings, cloud data (including iCloud), image and/or video uploads, or other electronic/web/cloud actions. The one-click may be provided on any number of related, linked, or independent websites or digital applications and allows registration and transfer of pet information (e.g., the pet profile) with one click.

The present invention includes the transfer of pet data, the transfer of pet data in one-click registration, and the use of transferred pet data at a customer site (or app, e.g., app 160). The customer site may pay for the registration or pet data pro rata according to how many registrations or pet data transfers are made, or a subscription, or free so long as the customer site provides a certain amount of advertising requested by the pet data organizer/collector, and the provided advertising itself may generate revenue for the organizer/collector. The requested advertising may be embedded in the transferred pet data or communicated separately.

The transfer of pet data via registration (e.g., one-click registration) or login (e.g., one-click login), may be accomplished by linking a mobile device ID of the user or other identification. In one embodiment, logins or registration are not user ID linked, but instead are a unique login as a pet. The login may be keyed (e.g. username like) to an associated pet, pet name, nickname, pet ID, etc. In various embodiments, the unique pet login or registration causes/allows the user to assume the identity of his/her pet when registering, logging in, or performing other tasks under the penumbra of his/her pet.

Cookies or other persistent data on a computer, mobile device, browser, etc. may retain pet names and customize the login/registration button with the pet's name (or image). A drop down menu may appear for a device associated with multiple pet names making it easy for a user to login and assume a selected pet's identity (a user may also be allowed to select more than one pet). In one embodiment, speech recognition is utilized to recognize a pet's spoken name and apply that to the login/registration button (e.g., "FIDO, please login here!"). In this manner data collection may be logged for the pet exclusive of owner's other, and corresponding ads (or other functions described herein) may be targeted to (or emphasized in light of) the selected pet and/or the pet owner/user in combination with the selected pet.

In one embodiment, the one-click registration is a transfer of exclusively pet information (or essentially exclusively pet information/pet data). Such information may include, for example, pet breed, age, weight, size, fur type, adoption date, adoption source, health, medical records, pictures, video, and/or renderings from pictures or video associated with the pet. The pet information transferred may be used for a variety of purposes including direct and/or targeted marketing. A gif, anime, cartoon, or actual image of the pet may be utilized in ads targeting either the pet or pet owner. In one example, an animation of a pet of the same breed and matching features of the pet (e.g., size, hair length, tail features etc.) is either included in the data or generated at the registered site using the data transferred during one click registration. The animation is then placed in an ad, or used as part of the registered site's programming.

The inventor recognizes that various public and private web sites, apps, vendors, etc. do not give away data for free, but laws regarding data are still being developed and a trend toward user control of their own data appears viable. The present invention includes reaching out to vendors, brick & mortar stores, credit cards, social media, etc., for any available data (via an API, for example). Various permissions that may be necessary to retrieve data may be part of the "electronic contract," or terms of use of a web site or application. Detailed and individual permissions may be provided via radio box click separately for various sites/applications (e.g., iCloud; Netflix; Facebook), and or grouped together such as (I hereby give permission for Pet Site to access my data with respect to all e-commerce sites; I hereby permit Pet Site to access all my social media postings regardless of purveyor; I hereby give permission to access my purchase history (Play Store, App Store, etc.), etc.—each acknowledged by a separate radio box click (or combined)).

The pet information transferred may be the entire pet profile or a subset thereof. The present invention includes metering out pet information consisting of only a portion of the pet data. The amount of pet data in the transfer may be based on the type of subscription or payment made by the registering site. At higher levels of subscription (or higher prices), greater and more detailed amounts of pet data may be transferred.

The present invention includes collecting information during game play. A user's style of play, including choice of weapons, protections, frequency of play, achievements, level, and likelihood and amount of aggressiveness in various situations is analyzed and included in the digital profile. Such information is collected from on-site gaming or retrieved via an API or other mechanism from related or remote sites (whether related or unrelated). The analysis may include weighting the various factors and determining a score indicating likeliness of certain personality traits such as introversion (introvert) or extroversion (extrovert), and then parlaying that score into either increased or decreased risk for various categories such as credit risk, insurance risk, rental risk, etc.

A "Paws Up" button that allows a user to indicate a pet's preference for digital content (e.g., movies, music, television programming), ideas, treats, food, toys, or other pet related products. In one embodiment, users are asked to fill out a more detailed questionnaire about pet like/dislikes (e.g., food type, brand, apparel, collars, etc.), and owner preferences as well (e.g., cost, brands, colors).

The present invention includes providing questions to users in a structure, sequence, or format such that the questions themselves provide information. For example, if questions are answered quickly it can be deduced that the user is interested in the topics and more details may be queried. If slowly, the more important questions for marketing may be asked first to help reduce loss of unanswered questions should the user lose interest (e.g., wrapping the questions up early to maintain interest and move a user on to shopping or targeted marketing. Another analysis may utilize how much time a pet owner (or other user) considered a question (or considered other options such as buying an item), comparing to time spent on other questions/items which they considered, and whether the pet owner chose one item over another option. All such data is collected and used to supplement or correlate with other data to determine priorities, likes, dislikes, inherent risks, and other quantifiable information about the pet owner/user which may then be utilized for targeted marketing, campaigns, or provided via, for example, an API, loaded into a shareable database, or other mechanism.

An Application Programming Interface (API) allows websites to retrieve the digital identity, profile, pictures, and preferences of a pet from an owner's unique mobile device ID. The present invention includes determining credit, insurance, property rental history, and other statistical data based on an owner's pet and/or other data. For example, a pet with a known high energy level may place the owner in a higher insurance risk category or deemed more likely to purchase a certain set or type of products. Analysis to determine such risks or likelihoods, may be performed and included in the pet data or computed by the receiving web site.

In one example, a pet owner (e.g., pit bull owner) may be correlated to a certain credit risk score and determined to be more likely to purchase a certain set of products based on the collected data and the breed and its known propensities, along with any additional data that may supplement, validate, or further refine the score or product set.

The present invention includes validating known propensities of certain breeds and then boosting or lowering scores even further in accordance with a validated propensity. For example, a user that purchases a muzzle may be assumed to own a pet more likely to bite—and the associated insurance risks would there be increased. If the pet breed is also known to be more likely to bite, the risk may be increased further (insurance, credit, and others). The risk may also be abated to some extent if an owner's purchase history includes such things as training guides which may correlate toward a responsible owner and a training program that would reduce the known or assumed risks.

The present invention includes verifying pet ownership information that a user submits as part of an application for insurance, credit, or property rental. For example, a user may submit through a website a rental application which includes a checkbox to indicate whether he/she owns any pets, the number of pets, and the breed and type of pets owned. The website may verify the truthfulness and accuracy of the user's answer via an API call. Such verification may be provided to third parties (credit card companies, property managers, etc.) via one-time fee payment or via subscription.

Data collected during such applications may be maintained and used to adjust other ratings. For example, if a property manager requests verification of no pets owned by a user, and the API returns false—meaning that the user is known to be a pet owner, the negative response may be logged and used to increase credit risk scores (and other ratings). As with other rating data, the data is weighted by how important it is such that one "bad" response does not necessarily turn all scores negative. The weighting may be made based on common sense or logic and verified, tweeked/optimized by reviewing similar incidents among a large dataset (e.g., deep learning environment).

Various credit agencies and other companies that maintain credit and other scores are under certain obligations, such as reporting, records, and compliance with various laws (e.g., only using 7 years history) which may or may not apply to various embodiments of the present invention. While more recent years are likely more indicative of a user's actual credit risk/capability, various embodiments of the present invention may maintain records for many years longer than regulated companies. The older data may be appropriately weighted and averaged, and such weighting may be modified, checked, and reanalyzed in various ways including deep learning algorithms applied against a large dataset. The present invention includes notification to a user and acceptance by the user for collecting, tracking and maintaining data over an unspecified period and/or the users' lifetime or longer.

The present invention includes preparing data for a fee or subscription to credit bureaus, credit card companies, banks, loan companies, and others. Such data may be retrieved via an API or provided in report form. Such reports may include a category and a factor or statistic that, for example, indicates an improvement or degradation in commonly accepted statistics as it applies to the pet owner. Table 1 below illustrates one example of statistical modifiers derived from data, interactions, game play, and others according to embodiments of the present invention,

TABLE 1

| Statistical Modifications | |
| --- | --- |
| Life Expectancy | +.057 |
| Auto Insurance Risk | +.105 |
| Credit Risk | −.022 |
| Medical Insurance | +.051 |
| General Liability | −.035 | that may be applied for example in rating schemas that determine pricing for insurance or credit products. The table illustrates, for example only, an increased auto and medical risks, decreased credit and general liability risk, and increased life expectancy. Further, the data in any report may be licensed for use in other reports (such as credit bureau reports).

The present invention includes taking a statistical modifier or any other product from the present invention and applying it to an existing actuarial process or any other related evaluation. Such application may occur in any way designed to enhance the accuracy of a probabilistic, statistical, or stochastic method, and/or any other prediction, average, rating, or forecast.

Reports provided by the present invention include pet owner reports, pet reports, or any combination thereof. The above table provides one type of pet owner report illustrating increased/decreased risks for various items related to the pet owner. A similar report for the pet itself may also be formed and include information about similar risks specific to the pet.

The report and each individual modifier or other analysis provided by the report may be based on entirely or in part on a pet profile and/or other information related to the pet profile. Some example portions of pet profiles are illustrated in Table 2:

TABLE 2

| NAME | Fido | | Duke | |
| --- | --- | --- | --- | --- |
| BREED | Labrador | | Pit Mix | |
| AGE | 2 y.o. | | 4 y.o. | |
| COLOR | Black | | Black & White | |
| LIKES | Frisbee | | Motorcycles | |
|  | Salmon | | Raw Meat | |
| VET | All shots | | No shots | |
|  | Flea meds | | No meds | |
|  | Bites = 0 | | Bites = 2 | |
| S. MEDIA | 54 pics | | 2 pics | |
|  | Action | | Bar scenes | |
|  | Sports | | | |
|  | Picnics | | | |
| B. STATS | Chew toys | 10 | Chew toys | 0 |
|  | Leashes | 10 | Leashes | 0 |
|  | Throw toys | 40 | Throw toys | 0 |
|  | Beds | 10 | Beds | 0 |
|  | Food | 30 | Food | 40 |
|  | Spikes | 0 | Spikes | 60 |

By no means is the pet profile or any inferences draw therefore dispositive as to any individual or pet. However, averages over large data sets can show trends that are more or less applicable in most cases. In the example above, it should be recognized that Fido and Duke are not only a breed apart, but are likely to live in vastly different environments and therefore should also have vastly different risk profiles.

For example, Fido is a breed known for loving the family life, and, while Duke might also fit that profile element, Duke is also a breed known to have a less than fun attitude in at least some situations. Fido is still a puppy, and Duke is a mature adult unlikely to share his turf readily. Fido likes Salmon and Frisbee—while this may also be a reflection of Fido's owner, such likes are amenable to a relatively low risk environment. On the other hand, Duke likes motorcycles and raw meat. As to veterinary care (again, at least as much a reflection of Fido's owner), Fido has had all shots, is on recommended meds, and has no bite history—unfortunately, Duke and his owner are on the wrong side of this item as well without any shots or meds and 2 documented bites. If that were not enough, Fido's social media is filled with jubilation and good clean fun, while Duke has few photos, and those contain bar scenes. One metric that may be considered in the present invention is simply the number of photos, more of which tend to show more social engagement—a known factor in both mental and physical health.

Finally, browsing stats (B. Stats) show that Fido/Fido's owner spends a healthy percentage of browsing time viewing various items necessary for a balanced life with an emphasis on healthy active toys (e.g., throw toys), while Duke/Duke's owner browses mostly for intimidation gear, such as spikes. Therefore, it should be apparent that a risk profile for Fido and/or Fido's owner will likely be very different (generally lower risk and higher credit score) compared to a risk profile for Duke and/or Duke's owner (generally higher risk and lower credit score).

Each of the profile items may receive a score, be weighted, and then combined to provide a score. Different scores or weightings may be applied to different categories of risk analysis. The final score or weighting for any one item may be determined by analyzing many profiles with known risk results and repeating the analysis many times for different weighting levels until all or a majority of the analysis are either correct, substantially correct, or at least better than other types of analysis that may be performed to determine similar risk results. Such processes may be performed via convolutional neural networks (e.g. neural networks for classification and regression), pretrained networks, transferred learning environments, and/or the like—any of which may be trained on GPUs, CPUs, clusters, and/or in the cloud. A deep learning environment over a large dataset is ideal for such evaluations, and such an environment may be specially programmed or obtained from one or more commercially available packages, such as those found in MATLAB.

The invention includes a purchasing profile that includes but is more sophisticated than simply registering various purchases and categories. The purchase profile is, for example, correlated and enhanced based on other collected data related to the pet(s) in question, other data such as breed, training history, size, weight, etc., and past purchases. Such correlations may include knowledge-based correlations such that certain breeds may require a particular type of training regime and an increased likelihood that an owner of that breed will purchase materials or training guides related thereto, especially if training is a known goal of the owner (determined via questionnaire or derived based on intelligent gathering of viewing habits or other means).

Figure 2:
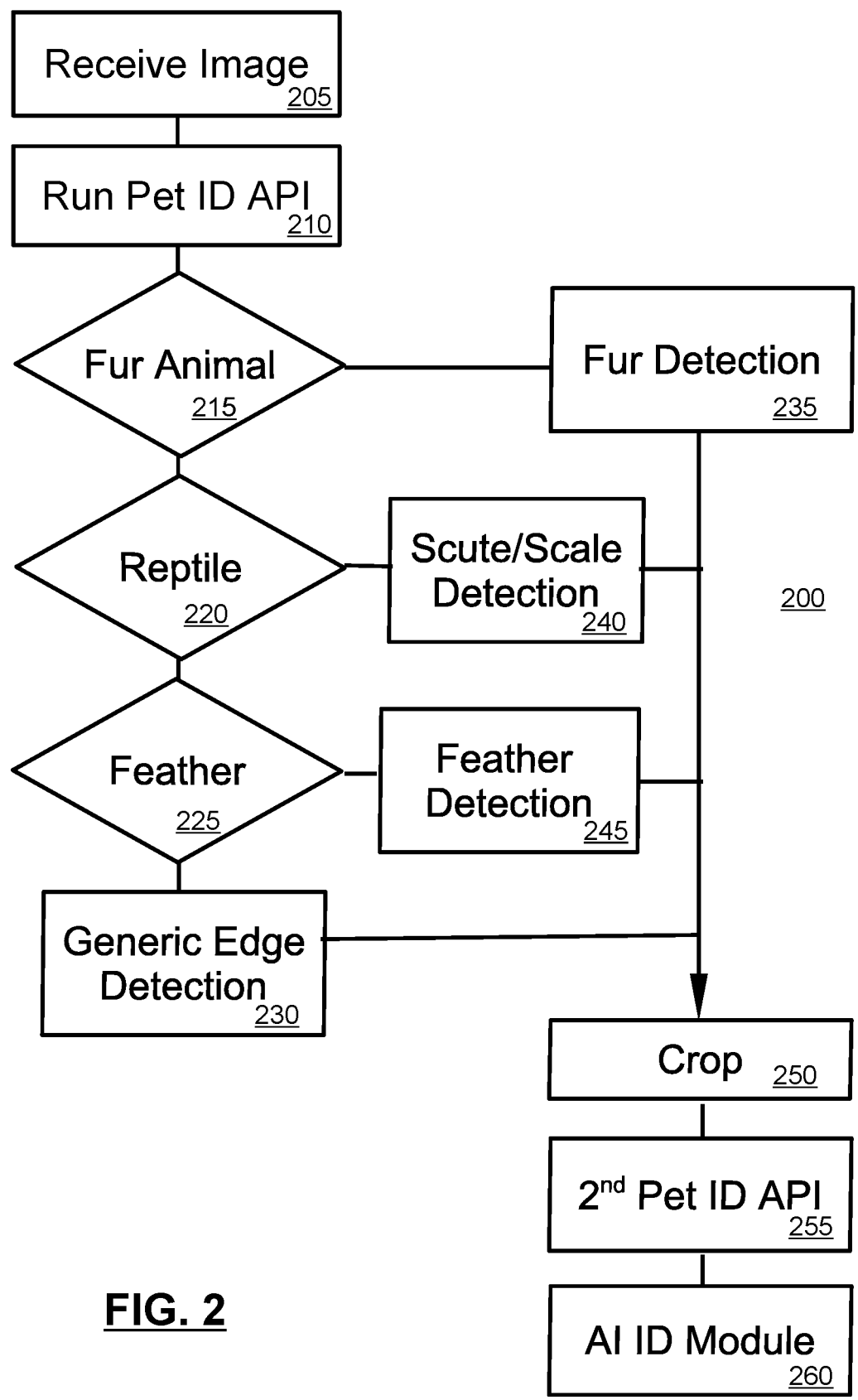
FIG. 2 is flow chart for a method of intelligently cropping out a background of an image or video according to an embodiment of the present invention.

FIG. 2 is a flow chart 200 for a method of intelligently cropping out a background of an image or video according to an embodiment of the present invention. This includes, for example, a method of intelligently cropping out a background of an image or video in which a Pet is featured based upon the unique characteristics of the pet's fur (or other outer dermis material).

As shown in FIG. 2, an image is received (step 205). Many options are available for processing the image and determining the pet, and in this example a 1$^{st}$ Pet ID API is called (step 210) which identifies the animal's general type. Based on the general type (e.g., fur animal (215), reptile (220), Bird (225), generic (230), etc.), and a corresponding specific outline detection process is invoked (e.g., Fur detection 235, Scute/Scale detection 240, and feather detection 245). The detection method outlines the animal so it can be cropped (step 250). At this point the image is mostly/solely the animal, which makes further identification processing less intensive. At step 255, a second Pet ID API is called, and the result will depend on the API, but may, for example, return a probability of the animal's identity or breed, and may also return other factors like color percentages, height, weight, fur type, fur direction, etc. These results may then be fed into an AI/deep learning module (e.g., module 260) or be utilized without further analysis.

The present invention includes a method of identifying all of the pixels that constitute a pet's fur follicle and the color and coordinates of the pixel in relationship to other non-pet related pixels in a photograph. or video frame. For example, in one embodiment, all pixels that constitute a pet's fur/fur follicles are identified. This may be done via fur color, and the method may be enhanced by emphasizing a pixel color search within the known colors of an identified breed. Colors not known to occur with the known breed and age of the pet may be disregarded in most cases.

The method may include determining an outline of the dog or cat by searching for and identifying the distinctive pixel pattern at the edges of the fur (a different, but no less distinctive pattern can be found at the edges of other types of animals including birds, reptiles, etc.). The method may include identifying all of the pixels that constitute a pet's fur follicle and the color and coordinates of the pixel in relationship to other non-pet related pixels in a photograph or video frame. Such relationships may include relative sizes of the pet and non-pet item as a whole, relative positions, comparison to typical pet/pet owner poses, popular pet activities, etc.

The invention includes isolating a pet in an image so that, for example, analysis of non-pet areas of an image is minimized. This may be done, for example, by removing (or minimizing) non-pet areas in the image. The invention includes a method of masking non-fur pixels in a picture or video frame to remove any elements or a photo that does not contain a pet.

The pet(s) may be identified in an image via any number of ways, including having the image submitted. by the pet owner as an image of his/her pet. The image may be cropped and centered on the pet and a the cropped centered image may be maintained in the pet profile or used in gif, anime, animation, and video or cartoon production suitable to be used in customized. targeted. ads, such as in accordance with, to, or suggested by other embodiments of the invention described herein. The invention includes a method of automatically cropping and/or centering a picture/video which contains a pet. The cropping and/or centering may be done, for example, where the pet is identified as the central element of the picture.

In one embodiment, the present invention is not identifying a pet and/or extracting a pet from an image but actually specifically identifying the pet itself, and a specific individual pet as well. Any of the above or other techniques may be utilized to either extract or outline a pet in an image, further identification of a number of features of the pet will further identify the type of pet (e.g., dog, cat, reptile, bird, etc.). Yet further identification is utilized to determine the breed of the pet, and yet further identification may determine the pet's name (and, e.g., verify login credentials and/or initiate further data collection by the site, cookies, or other means).

For example, from an image, fur detection or extraction techniques may be utilized to determine an outline the of pet which can be compared to a dataset of typical pet outlines to identify the type of pet. A similar approach may also narrow the breed to large/small or certain types of breeds. Recognition of proportions/comparison of various body parts of the pet can provide further information to help identify the breed. Color, amount of fur, and fur direction, especially when combined and utilized with other data known from the image can provide detailed probabilities as to the breed, and specific animal as well. Knowledge of where the picture was taken or any social media. posts related to the image provides further information. Metadata of the image may also provide further information such as location and more.

Comparison of the pet to a database of known pets and/or owners (e.g., comparison to pet profiles such as produced by other embodiments of the invention) allow for recognition of the pet and identify it specifically. Such comparison may be an image-to-image comparison or a comparison of data such as color, fur type, and/or other data maintained in the database and associated with the known pets. The comparisons may be made directly to images posted on social media, or social media (and other Internet postings) may, be scanned and collected to form or supplement a database.

The comparisons may be to identify the breed (e.g., comparing an image to a set of images in the database of known verified breeds) or to identify a specific pet/pet's name (e.g., comparing an image of a pet to be identified to images of other similar pets to find an "exact" match—here, "exact" meaning close enough to identify the images are of the very same animal, e.g., both. images of FIDO). An "exact" match search may, for example, be performed after identifying the breed of the target and/or any other data points that can narrow the number of possible matches in the database.

The present invention includes preparing database entries of pet information. (e.g., pet profile, or a pet's digital profile) and then supplementing the database with information gleaned from scanning social media and the Internet general. The image utilized in such comparisons may be from a photo, video, video frame, or otherwise extracted from a video or other image.

Figure 3:
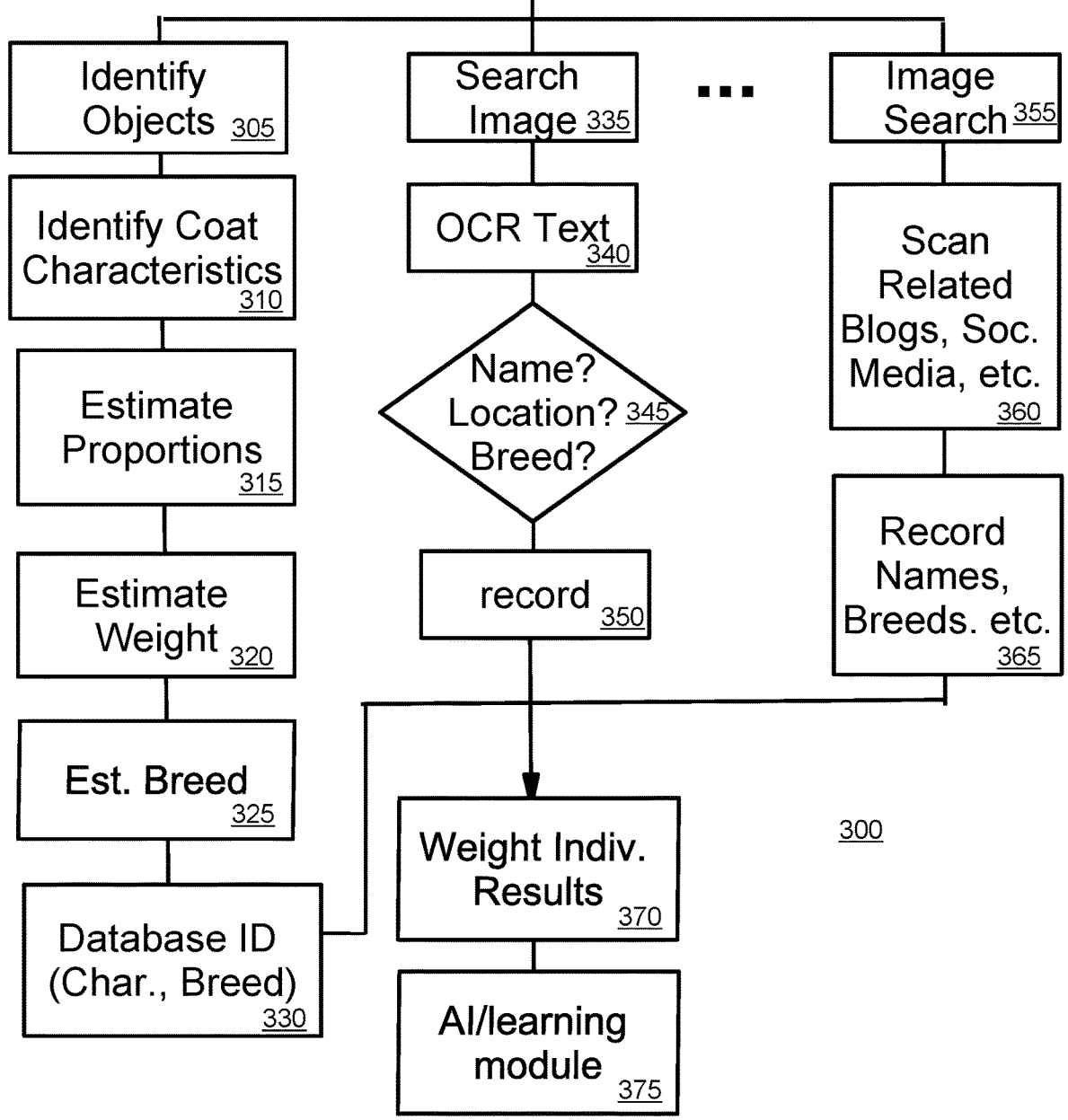
FIG. 3 is a flow chart for a method of detecting the breed, age, fur, facial features, and identity of a pet according to an embodiment of the present invention.

The present invention includes a image & video recognition system which detects the breed, age, fur, facial features, and identity (e.g., exact identity of a pet). FIG. 3 is a flow chart 300 for a method of detecting the breed, age, fur, facial features, and identity of a pet according to an embodiment of the present invention.

As shown in FIG. 3, an image 301 is processed in a multi path method that may be parallel or sequentially processed. On a first path, an API or other processes are utilized to identify objects in the image (step 305). Objects such as dog, person (girl) leash, path, road, all of which can be identified or extracted from the image. The identified objects may be sized by, for example, relative size proportions, measurement of shadows, etc. The sized objects may then be utilized to gauge size, weight, etc. of other objects in the image. For example, people have average heights and bone structures which when identified in the image can be used as a "yardstick" to estimate height, weight, and proportions of the dog (e.g., as in step 315). These physical characteristics alone may be sufficient to identify the dog's breed (step 325). The coat characteristics are also identified (step 310), which may include color, patterns, hair count/density, fur direction, etc.). The "yardsticked" proportions may also be utilized to size the dog or other pet and estimate weight (e.g., estimate volume and multiply by average pet volume weight ratio) (step 320). A weight estimate along with coat characteristics, proportions, etc. Allows for a breed to be determined with some accuracy. The breed along with the characteristics and other data may be saved in a database along with an ID (step 330) that indexes into the database.

On a first alternative, sequential, or parallel process, the image itself is searched. The search (step 335) may be for objects that provide clues as to the dog's identity/breed. Such a search may, for example, uncover a sled, which might suggest a Husky breed. The image itself may be OCR'd (step 340) as there may be writing in the image that can be recognized. For example, with magnification, the dog's physical tags attached to a collar or harness may be legible & recognizable. The dog's name and its breed may be readable directly from the image, and street or city signs (if any) may identify the location of the image, all of which should be queried and recorded (e.g., indexed into the database) (steps 345 and 350).

On a second alternative, sequential or parallel process, an image search may be performed (step 355). Such a search could be a complete crawl of the Internet or a search of specific sites (e.g., Facebook, Instagram, Pet Parade). The search is looking for hit(s) of where the image may have been posted. For each hit, (preferably all) related posts, blogs, social media, etc., are scanned (step 360) for names, breeds, and other information.

The scans may be multi-level. For example, a hit on a blog site may contain references to a certain dog name which should be noted and weighted appropriately as a first level reference (e.g., having an image of a dog in a blog along with a dog's name in the blog is significant). The blog may reference other blogs by the same or different author. The other article may also mention the dog's name, which would be weighted as a second level reference (important, but not as significant). If by a different author, perhaps even less significant. Additional intelligence, such as searching for other pictures of the same dog may also be performed. Such searching may continue for any number of levels, but the most bang for the buck is likely found in the first 2 levels with the original image, and other hits, while potentially important as well and should be logged/recorded (step 365) and considered, should also be weighted accordingly (e.g., step 370).

Other alternative/sequential/parallel processes may further be implemented. The present invention includes the use of multiple separate and distinct process to gather the same and different data to identify, corroborate, and cross-check the dog's (or other animal's) name, breed, etc. Data, results, inferences, conclusions, etc. from each of the different processes are weighted according to their probability, potential accuracy, etc. (step 370). Preferably, all relevant data is collected and entered into an AI/learning based (e.g., machine learning or deep learning) decision module (step 375) that has been conditioned/learned over a large dataset.

The present invention includes accepting as input a video or photo of an unknown pet and determines the identity of the pet and the pet's owner by matching the unique physical traits of the pet as depicted in the picture/video, date of the picture/video, location at which the picture/video was taken to a database of pet pictures, videos, and profiles. Other methods may be used. For example, location of an image, the location can be used to query outside sources for information that assists in the identification tasks. Size, for example, can help determine the identity of a dog, as smaller dogs may be more populous in some areas (e.g., urban areas). Location can also be useful in identifying the dog in a picture. For example, background colors (average background colors of a location) may be deduced from street view or satellite images of the location—although clearly not definitive, such derived or assumed background colors have a probability success associated with them which may then be applied to an algorithm, heuristic, or machine learning process to make better predictions and decisions. Ultimately, identification of the background (and its removal in helping to identify the pet) is enhanced by having a color or range of colors commonly found at the location where the image was acquired. Further, in some areas of the world certain dogs are more popular.

The present invention includes identifying various features of a pet's fur and applying the identified features in an algorithm or AI process that uses those features in determining the pet's breed and/or identity. Such features include hair count, hair length, color patterns, and direction of the pattern. The present invention includes a system that analyzes the hair count, color patterns, and. direction pattern of a pet's fur to determine its identity, breed, and age. The invention further includes a system that analyzes the whisker count, nose size, tongue length, eye color, and facial features of a pet to determine its identity, breed, and age.

The identification of breed and other information about the pet and owner (e.g., preferences, likes, history, etc.) are correlated to purchasing data, credit score, insurance risk, and/or others. This allows various factors and statistical information about the pet owners in general to be determined. Such as factors include life expectancy, credit risk, future purchasing habits, insurance ratings (including ratings for all forms of insurance, such as auto, home, boat, health, life, liability, veterinary, etc.), rental history, rental history with respect to pet ownership (e.g., likelihood of successfully completing a rental term without issues, e.g., rental risk), hospitalization risk with respect to pet ownership, veterinary costs risk, etc. These factors may be separately correlated based on the type of pet (e.g., Dog vs. Cat vs. Reptile owner), correlated in combinations (e.g., Dog & Reptile owner vs. Cat owner, or Cat & Fish owner), and correlated to the various breeds, ages, other factors, etc. These correlations are merely examples, and are used to cross-correlate the various forms of risk, financial health or responsibility of the various categories of pet-owners.

Such correlations are preferably broken down into the various breeds of the broader animal classes. Although useful by itself, such correlations are enhanced by correlating the owner's pet and pet's breed with other traits of the owner (and/or the owner's pet's preferences, likes, etc.) collected throughout the various embodiments described herein. Further pet owner traits, habits, and other relevant information may be collected from publicly available information and databases, including pet adoption records, pet registries, pet license records, property ownership records, court records, vet records, social media postings of the pet owner and pet owner's friends.

A pet owner's friend's postings, while relevant, may be weighted less than the pet owner's own postings. The postings may themselves be analyzed to determine if the pet owner is a leader or follower in postings which may increase or decrease the weight of the pet owner's own postings.

The analysis of social media postings includes the analysis of images, which may include the identity of objects in the images. Objects such as motorcycles may reflect an increased risk and even more so when the pet owner's pets include more dangerous animals/breeds (e.g., Duke's risk may be further negatively affected). The goal of these additional analyses is to supplement, enhance, or refine the data correlations made directly from the app or other platform (including customer platform(s)), thereby increasing accuracy of the associated credit, insurance, and other risks or products.

Figure 4:
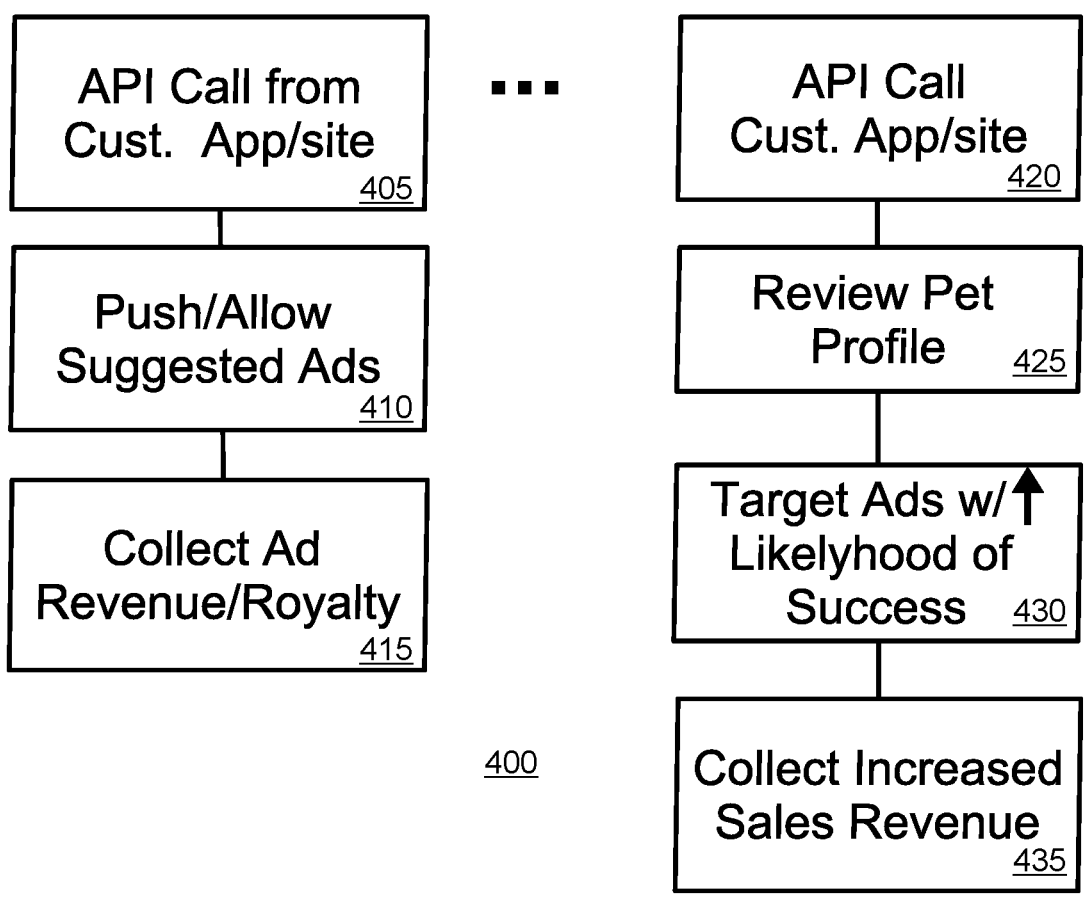
FIG. 4 is a diagram illustrating data flow and processing for an advertising system which targets ads and/or content based on a pet's digital profile according to an embodiment of the present invention.

FIG. 4 is a diagram illustrating data flow and processing 400 for an advertising system which targets a pet or a pet owner based on a pet's digital profile. As shown in FIG. 4, an API call (405) from a customer's app or site provides data which may include a pet profile, advertising materials, likes, etc., related to the pet identified in the API call. The amount of data and the existence or extensiveness of the pet profile may be a function of a subscription level or cost paid by the customer. At a fundamental level, the API call may only return ads, or links to ads that have been preselected for the pet identified in the API call. The customer site need only push the ads out to the viewer (e.g., step 410) and collect the royalty or other revenues (step 415). The revenue may be, for example, a flat fee or split (e.g., split with proprietor of the API) on any click-throughs generated therefrom.

Another possibility is retrieval of an extensive pet profile that is reviewed (step 425) to determine the most appropriate ads. This requires additional effort on the customer's side, but may provide more flexibility to the customer on the selection of ads, and information known by the customer potentially making the customer's selections better. Ultimately, it is envisioned that such selections are made based on the ads with the highest likelihood of success, whether that is a purchase, click through or other revenue source.

The present invention includes an advertising system which targets ads based on a pet's digital profile. For example, a method of serving an advertisement to a user that features picture or video of the user's actual pet or picture or video a pet resembling the user's pet. The present invention includes taking an image from the digital profile and integrating the image advertising material served to the pet's owner or one of the pet owner's friends. Alternatively, the served advertisement may include both the owner's pet's image and at least one of the pet owner's friends' pets' images. Obviously, the owner's attention is drawn when his pet is featured in an advertisement, more so when the advertisement features both his/her pet with a friend's pet. In one embodiment, the invention targets an ad to user and. constructs the ad by reaching out to the pet. profile of the user's friend's pet to retrieve the additional imagery to place in the targeted ad, or the user's friend's pets images may be placed in the user's pet profile.

The decision of which pet(s) are included in the served advertisement can be made based on the pet owner's location, location history, and/or various historical and recent interactions with the friend, postings showing the pets together or discussion between them about the pets would carry significant weight in such a decision. Machine learning may be utilized for a wide range of interactions and refine results that are effective, both for identification of the pets in images (uploaded to various apps, posted to social media, etc. are potential sources for images identifying the pets together) and for determining the effectiveness of the "together" ads.

The pet owner's pet's image featured in the ad may be the actual image. In some embodiments, the images are rendered as drawings, pop-art, watercolor, or characterized as cartoons, bobbleheads, etc. In one embodiment, in addition to rendering the pet's image, the image is accessorized or blended with various holiday colors and trappings (such as black/orange for Halloween, pastels for Easter, fireworks for the 4th of July (or Bastille Day) , Happy New Year decorations for the new year, etc.).

The present invention includes a method of triggering (push) an advertisement featuring the user's own pet or a pet resembling the likeness of the user's pet to be displayed on a mobile device, television, computer, or billboard (including signage such as that displayed at airports or billboard signage displayed in stadiums, sports arenas, on buildings in large cities, along freeways, etc., and preferably such signage is remotely programmable and capable of displaying video) based upon the location history of a user's pet, pet's food preference, pet's health history, pet's sleeping patterns, etc.

The pet's profile image may be, or include, a video. The video may be the pet extracted from a video in the pet profile. In one embodiment, the pet profile includes a video of the pet with the pet already extracted. Like the discussion above regarding images, the video images (with or without the pet extracted) may also be rendered in any known form (drawing, cartoon, etc.) and may also be pre-rendered in the pet profile and/or rendered by a user of the pet profile.

In one embodiment, the pet rendering is not integrated into the ad per se, but is associated with the ad. For example, the targeted ad may be displayed (in a side bar of a web page/app screen for example), and the extracted pet runs across the top of the main page/app screen and disappears with a starburst (or sits) next to (or in) the targeted act.

The present invention includes a method of serving (pushing) an advertisement to a user that features the name of the user's pet. For example, a banner in an ad may read: "Fido Likes GRAVY TRAIN dog food! (thumbs up)." Like images and videos, the pet profile may include the pet's name. The pet's name is retrieved from the profile and integrated into the ad. In one embodiment, the pet's name may be used in a separate ad or space on the page/app screen that tells the pet's owner to look across the page or app screen to the targeted ad (e.g., Fido says: "Read the ad over there→ (arrow) about flea & tick spray). Such an ad may be targeted, for example, during tick season after scans of social media determine that the pet owner has recently gone hiking (which may be determined via one or a combination text scans and/or image scans).

In one embodiment, the invention includes pushing a name modified ad to eletronic signage or billboard(s) in a location or area the owner is identified as being. For example, via information sharing (or purchase), social media, or other locating mechanism, a user may be identified as driving a certain freeway, paying a bill at a restaurant at a local attraction. The pet's profile may be used in any of the ways noted. herein to populate an ad on signage in the same general vicinity or in the very location of the pet owner (e.g., signage at the cashier of the restaurant/local attraction the pet owner is located).

Figure 5:
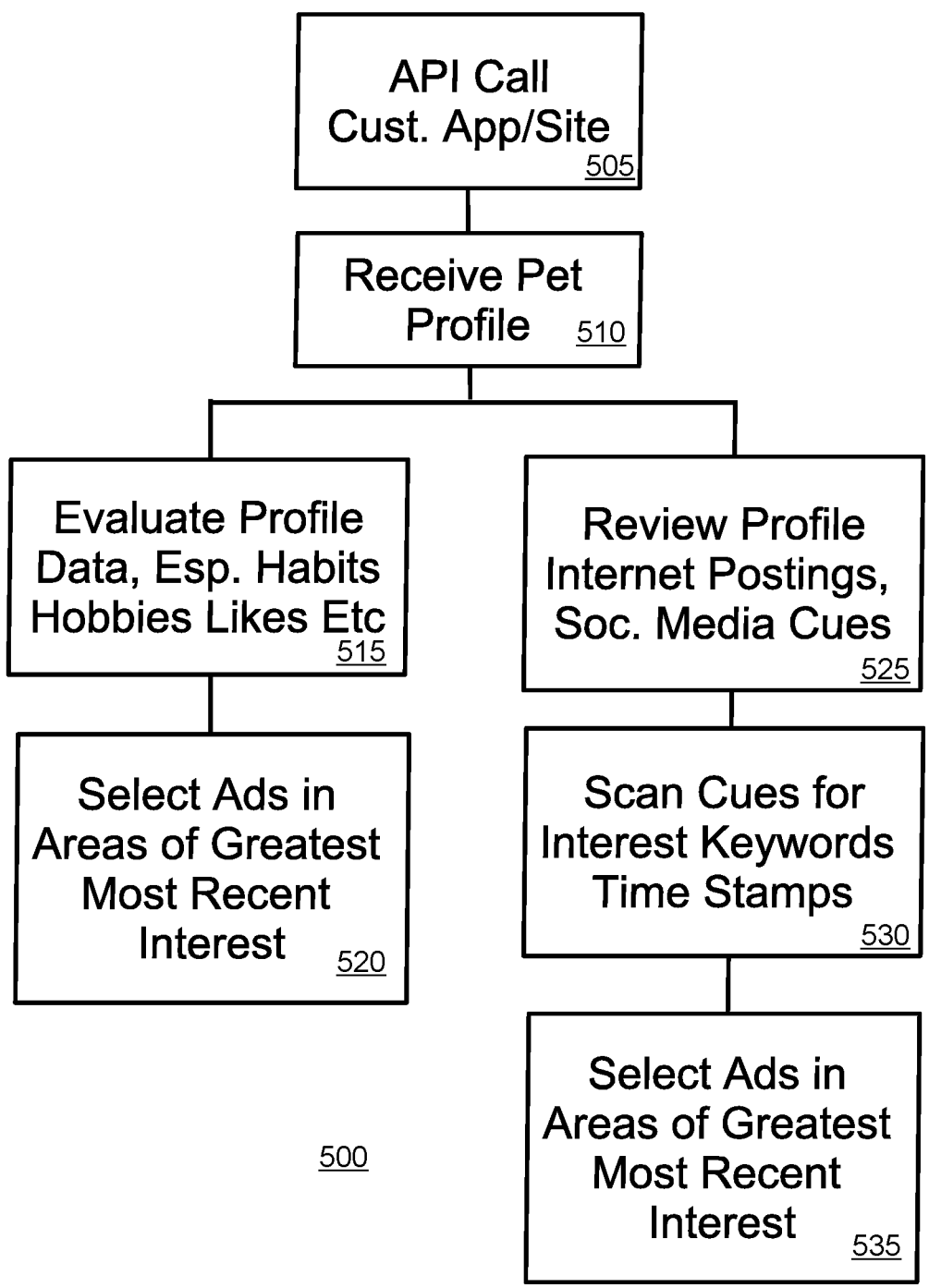
FIG. 5 is a diagram illustrating data flow and processing for a system to predict a user's interests, buying behavior, and score for various purposes according to an embodiment of the present invention.

FIG. 5 is a diagram illustrating data flow and processing 500 for a system to predict/determine a user or pet owner's interests, buying behavior, and score for various purposes according to an embodiment of the present invention. The processes begin with an API call 505 to retrieve a pet profile (step 510). In one implementation, the profile data is evaluated (step 515) which is a review of, for example, hobbies, habits, likes, etc. Based on that knowledge, Ads may be selected (step 520) that are of the greatest most recent interest of the pet.

In a more detailed implementation, the pet profile is reviewed for leads, links, or cues to Internet postings, social media, and the like related to the pet (step 525). They are scanned (step 530) to find, for example, timestamps, keywords, and frequency of keywords related to likes, hobbies, habits, etc. Images related to the postings may also be analyzed for similar information from items or activities shown in the images. The social media and other posts may be scanned at further levels and appropriately weighted as well. As with all processing or searching that may be performed at a customer site, similar routines may be performed internally (by the pet profile maintainer) initially (when building the pet profile), just-in-time prior to responding to an API call, and/or on a periodic basis to maintain the pet profiles.

The present invention includes a system that predicts a user's interests, buying behavior, credit score, and insurance risk profile based on a pet's type, age, size, fur type, breed, adoption date, adoption source.

The present invention includes a unique method of collecting data about music, movie, and entertainment, car, travel, purchase preferences from various users. The method may include the steps of showing two (or more) pictures or videos of an artist, actor, movie, car, place, or object. The user(s) may then swipe off the picture that is their least favorite such that their favorite remains. The favorite that remains may then be paired off against another item or items in the same (or similar) category. Preferably, the process repeats such that the system collects information about how a user ranks related items based upon the user's binary choices. Such information may be fed back into any of the selection processes discussed elsewhere herein.

The present invention includes machine/deep learning, Artificial Intelligence (AI), heuristics, probabilities, and/or general problem solving and may be based on rules. Such rules may include, for example:

Labrador owners are X times more likely to buy a specific brand of car

Cat owners prefer the color blue

Poodle owners are Y times more likely to shop at luxury stores

Pitbull owners are more risk averse and are higher insurance risk

Chihuahua owners are X timed more likely live in urban areas or other rules, generalities, or assumptions known or that might be helpful (not necessarily perfect) in reaching the goal of connecting a pet owner to a relevant, necessary, or needed product or service whether or not specifically discussed herein. Ultimately, such rules may be utilized in the various embodiments to evaluate various risks, push ads, etc.

Although the present invention has been described herein with reference pets and pet owners, the same techniques and processes may be applied to other relationships such as breeders & animals, managers and athletes, business owner's to customers. The devices and processes of the present invention may be applied to these relationships by evaluating one member of the relationship and targeting advertising or other goals based on a profile of the other party.

In describing preferred embodiments of the present invention as illustrated in the drawings and as discussed herein, specific terminology is employed for the sake of clarity. However, the present invention is not intended to be limited to the specific terminology so selected, and it is to be understood that each specific element includes all technical equivalents which operate in a similar manner. For example, when describing serving an ad, any other equivalent process or mechanism, such as displaying, listing, embedding, or other process or mechanism having an equivalent function or capability, whether or not listed herein, may be substituted therewith. Furthermore, the inventor recognizes that newly developed technologies not now known may also be substituted for the described parts and still not depart from the scope of the present invention. All other described items, including, but not limited to ads, image processing, image recognition, characterization, targeting, rules, heuristics, AI, machine learning, rules, etc. should also be considered in light of any and all available equivalents.

Most processes of the present invention may be conveniently implemented using a conventional general purpose or a specialized digital computer or microprocessor programmed according to the teachings of the present disclosure, as will be apparent to those skilled in the computer art. the microprocessor may be, for example, a mobile device such as android or iPhone smartphones, tablets, laptop or desktop computers, devices running Java or browsers viewing web pages. The programming of the present invention may be run on an end computer or server connected over the internet serving a web page browsed by a user. The programming of the invention may reside in an app on a smart phone or split between running on a server or backend and an app or other local application on a smartphone, laptop, PC, etc.

Appropriate software coding can readily be prepared by skilled programmers based on the teachings of the present disclosure, as will be apparent to those skilled in the software and programming art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer/microprocessor to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, cloud storage, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, databases, and user applications. Ultimately, such computer readable media further includes software for performing the present invention, as described above.

Included in the programming (software) of the general/specialized computer or microprocessor are software modules for implementing the teachings of the present invention, including, but not limited to, object recognition, pet identification, fur identification, selection and cropping functions, social media searching, location identification, AI or machine learning based on rules, process improvement, or other paradigms, and the display, storage, or communication of results (including targeted ads based on, for example, user preferences and pet profile) according to the processes, systems, and devices of the present invention.

The present invention may be embodied in many forms and the various steps of methods or process do not necessarily have to be executed in a fixed order as will be apparent to the skilled artisan upon review of the present disclosure. In one embodiment, the invention comprises a system for providing targeted ads, comprising an API having an input for a pet owner ID (which may be a pet ID, a pet owner ID, an ID, a mobile device ID, an address etc.), a database of pet profiles, and a server configured to retrieve a pet profile based on a pet ID received via the API, and send the pet profile out via the API. The pet profile includes an image of the pet, and the image of the pet may be characterized. The system may further comprise a deep learning component that analyzes at least one of previous actions, purchases, habits, viewing time, location history, and social media postings related to the pet owner ID and determines likelihood of purchasing various types of products.

In one embodiment, the includes a method of collecting and sharing data, comprising the steps of identifying a pet owner, collecting data about the pet and storing the data in a pet profile, and linking the pet owner and the pet profile via an identifier. The pet profile may comprise an image (at least one image) of the pet and at least one of name, nickname, type, breed, age, weight, photos, videos, food preference, toy preference, adoption date, adoption source, birthdate, and location (and/or any other quantifiable collectible data or associations). The pet profile may comprise breed determined by an automated process that recognizes the breed from an image of the pet—e.g., where the breed is recognized by submitting the image to a breed recognition API and the image is enhanced prior to breed recognition by the API. The image enhancement may comprise removing a background of the image, sharpening edges (fur and skin edges) and/or removing known non-pet items from the image. And, the method may include serving the pet profile to a customer that identifies the mobile, device ID, or other value/item associated with the pet or pet owner.

The invention includes a method of intelligently cropping out a background of an image or video in which a pet is featured, comprising a step of cropping an image along the outline of a pet by recognizing unique characteristics of the pet's fur. Those unique characteristics may comprise a fur edge pattern, fur density, hair count, fur direction, color (e.g., pixel color matching), or other attributes individually or combined, and any one or more of such characteristics may be verified by matching to a breed of the pet if known.

An embodiment of the present invention is a risk assessment system comprising a data collection system configured to collect data associated with a pet (or pet owner), an analysis component that analyzes the collected data and determines risk for at least one of life expectancy, accidents, and credit. The collected data may include pet breed information and the analysis component may utilize pet breed in determining the risk. The analysis component may include a deep learning component that parses the collected data, draws connections from the parsed data to a risk category, and then makes the risk determination. Such parsing, connections, and risk determination may be performed over a large dataset. The parsed data may be weighted making each connection more or less important depending on the weight. The weightings are changed and risk determination is repeated over the large dataset, and the changes are kept or used to base future changes if the resulting risk determination is improved. The weightings may be changed and risk determination repeated over a large dataset, and the changes are kept or used to base future risk determinations if the changes result in an improved risk determination. The risk determination may comprise, for example, at least one of insurance, property rental, and credit risk determinations, and may be reported to a customer via an API or written report.

The present invention includes a registration system, comprising a data collection process configured to retrieve and maintain pet information, such as a pet profile, an interface mechanism configured to accept requests from a requester including an identification keyed to at least one pet profile and return at least a portion of the pet information to the requester. The requester may be, for example, a third party such as a web site or an app that receives permission to request the pet information via a one-click operation by an owner of the pet whose information is being requested.

Any of the methods or processes of the present invention may be embodied in a set of computer instructions stored on a computer readable media—those computer instructions, when loaded into a computer, cause the computer to perform the steps of said method. The computer instructions may be compiled and stored as an executable program on said computer readable media.

The invention includes identifying an identity of a pet, comprising the steps of retrieving an image of the pet, determining one or more identifying characteristics of the pet, and identifying the pet from the characteristics. The step of retrieving may comprise extracting the image from a photo or a video. The step of determining one or more identifying characteristics may comprise identifying at least one of fur density, fur direction, size, and proportions of the pet. The method may further comprise a step of identifying metadata from/of the image of the pet, and the step of identifying comprises identifying the pet from the characteristics and metadata. The method may further comprise additional steps of scanning an image for text, or searching the web for online posts of the image. The step of identifying may comprise at least one of identifying a type of pet (e.g., dog, cat, reptile), identifying a breed of the pet, and identifying a name of the pet.

In one embodiment, the invention comprises a pet based system including a login/registration system that grants access according to a pet name, pet ID, or the like. The system may further comprise a database of pet information organized as a set of pet profiles one for each of registered pets in the system. The login/registration may comprise one of a login with the pet based system and registration of the pet based system with a customer site. Registration with a customer site may comprise transferring information about a pet according to the pet name to the customer site. The transferred information may comprise at least one of pet likes, dislikes, preferences, and images.

In another embodiment, the invention is a reporting system comprising a collection of statistical or other information about pet and/or pet owner, an analysis device configured to determine an amount of increased or decreased risk for the pet or the pet owner based at least in part on the statistical or other information, and a reporting mechanism configured to report the analysis or portion thereof to a customer. The risk may comprise at least one of credit risk, insurance risk, rental risk. The reporting mechanism may comprise an API call by the customer to the reporting system. The reporting system may comprise a hard copy report mailed to the customer.

The invention also may be embodied as a method of identifying a pet, comprising the steps of, receiving an image of the pet, identifying the pet in the image, comparing the pet in the image to known pets, and determining the closest match of the comparisons. The step of comparing may comprise comparing the pet in the image to multiple instances each of a number of breeds, and the closest match comprises the highest percentage of matches within a certain breed. A match being established, for example, by matching or substantially matching established breed characteristics with characteristics of the pet in the image. The number of breeds may be determined by matching or substantially matching established breed characteristics with characteristics of the pet in the image. The established breed characteristics may comprise at least one of color, fur density, fur direction, height, weight. The step of comparing may comprise comparing the pet in the image to images of other animals of a same breed in a pet database until a match identifies a specific pet in the database as being the same animal.

The invention includes a method identifying a pet, comprising the steps of, identifying an image of the pet, and performing at least one of searching the image for a name or breed of the pet, scanning portions of the Internet to the image of the pet for a name or breed of the pet, and comparing the pet in the image to other images of pets. The scanned portions of the Internet comprise social media postings. The step of comparing may comprise one of (1) comparing the pet in the image to pets in other images to identify a breed of the pet in the image, and (2) comparing the pet in the image to pets in other images to identify the same pet in the image. The step of searching the image may comprise at least one of searching a name of the image, searching for images of text in the image, and searching metadata of the image.

In light of the foregoing, it should be understood that the present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A system of identifying an identity of a pet, comprising:
   a reception processor configured to receive an image of the pet;
   a characteristic processor configured to determine at least one identifying characteristic of the pet; and
   an identification processor configured to identify the pet from the characteristics;
   wherein the identification processor further comprises a comparison processor configured to compare the pet in the image to multiple instances each of a number of breeds, and the closest match comprises the highest percentage of matches within a certain breed, and wherein the matching comprises substantially matching established breed characteristics with characteristics of the pet in the image.

2. The system according to claim 1, wherein the reception processor comprises an extraction processor configured to extract the image of the pet from a larger image, photo, or video.

3. The system according to claim 1, wherein the image of the pet is served in a video to a device identified by an ID linked to the pet.

4. The system according to claim 1, wherein determining the at least one identifying characteristic comprises identifying at least one of fur density, fur direction, size, and proportions of the pet.

5. The system according to claim 1, further comprising a metadata processor configured to identify metadata from/of the image of the pet, and the identification processor is further configured to identify the pet from the characteristics and metadata.

6. The system according to claim 1, wherein the established breed characteristics comprise at least one of color, fur density, fur direction, height, weight.

7. The system according to claim 1, wherein the identification processor is further configured to at least one of identify a type of pet, and identify a breed of the pet, and then identify a name of the pet.

8. The system according to claim 1, further comprising intelligently cropping out a background of an image or video in which a pet is featured, comprising cropping an image along the outline of a pet by recognizing unique characteristics of the pet's fur.

9. The system according to claim 8, wherein the unique characteristics comprises a fur edge pattern.

10. The system according to claim 8, wherein the unique characteristics comprises one of fur direction, fur density, and hair count.

11. The system according to claim 8, wherein the unique characteristics comprise pixel color matching color of the breed being outlined.

12. The system according to claim 8, wherein the unique characteristics comprise matching characteristics of a known pet.

13. The system according to claim 1, wherein the identification processor identifies a breed of the pet.

14. The system according to claim 1, wherein the identification processor enhances the image and then recognizes the pet in the image.

15. The system according to claim 14, wherein enhancing the image comprises removing a background of the image.

16. The system according to claim 1, further comprising determining a mobile or device ID associated with the identified pet.

17. The system according to claim 1, wherein identifying the pet comprises comparing the pet in the image to known pets.

18. The system according to claim 1, wherein identifying the pet comprises identifying a breed of the pet and then comparing the pet in the image to images of other animals of a same breed in a pet database until a match identifies a specific pet in the database as being the same animal.

19. The system according to claim 1, further comprising placing one of an image and characterization of the identified pet into an advertisement.

20. The system according to claim 1, further comprising placing one of an image and characterization of the identified pet into an advertisement served to an owner of the identified pet.

* * * * *